United States Patent [19]

Lumby et al.

[11] Patent Number: 4,975,395
[45] Date of Patent: Dec. 4, 1990

[54] SUBSTITUTED SILICON NITRIDE MATERIAL AND METHOD OF PRODUCTION THEREOF

[75] Inventors: Roland J. Lumby, West Midlands; Raj K. Rajput, London, both of England

[73] Assignee: Vesuvius Zyalons Midlands Limited, Mid-Glamorgan, Wales

[21] Appl. No.: 332,910

[22] Filed: Apr. 4, 1989

[30] Foreign Application Priority Data

Apr. 9, 1988 [GB] United Kingdom ................. 8808356

[51] Int. Cl.$^5$ ............................................... C04B 35/58
[52] U.S. Cl. ......................................... 501/98; 501/97
[58] Field of Search ............................. 501/96, 97, 98

[56] References Cited

U.S. PATENT DOCUMENTS

| | | | |
|---|---|---|---|
| 4,443,394 | 4/1984 | Ezis | 264/65 |
| 4,659,508 | 4/1987 | Higuchi et al. | 252/516 |
| 4,830,800 | 5/1989 | Thomas et al. | 264/65 |
| 4,881,950 | 11/1989 | Bhat et al. | 51/307 |

*Primary Examiner*—William R. Dixon, Jr.
*Attorney, Agent, or Firm*—Nixon & Vanderhye

[57] ABSTRACT

Substituted silicon aluminum oxynitrides are made electrically conductive by inclusion of titanium nitride at low levels, e.g. 15–38 vol %, by inclusion of titanium dioxide and in situ conversion thereof to titanium nitride which is contained in an intergranular phase. Further improvements in conductivity can be achieved by converting the intergranular phase from a glassy state to a crystalline state.

21 Claims, No Drawings

SUBSTITUTED SILICON NITRIDE MATERIAL AND METHOD OF PRODUCTION THEREOF

This invention relates to a substituted silicon nitride material which has good mechanical properties and which is also capable of being electro-discharge machined, and to a method of producing such a material. More particularly, the present invention relates to the production of such materials which comprise a beta-phase substituted silicon nitride of the formula $Si_{6-z}Al_zN_{8-z}O_z$ (where z is greater than 0 but not greater than 3), or mixture of such substituted silicon nitride and an alpha-phase substituted silicon nitride of the formula $M_x(Si,Al)_{12}(O,N)_{16}$ (where x is not greater than 2 and M is a modifying cation, e.g. yttrium, calcium, lithium, magnesium or cerium).

It has been proposed (Sumitomo Technical Review-January 1985) to add titanium nitride (TiN) to silicon nitride to obtain a material which is capable of electro-discharge machining. It has also been proposed in "Electro-Conductive Sialon" by K. Maruta et al, Hitachi Metals Limited to add TiN to silicon aluminium oxynitride (sialon). It is also disclosed in such document that electrically conductive sialon with more than 40 vol. percent TiN shows good machinability on electro-discharge machining and that addition of TiN up to 50 vol. percent does not disturb the densification of sialon by pressureless sintering.

It is known that the addition of materials other than TiN has an adverse effect on high temperature properties of sialons. In particular, it is shown in JP-A-54-123113 (Asahi Glass Co. Ltd) that the oxygen content of the product is critical and that, with less than 0.3%, the material will not sinter, whereas with about 5% such large volumes of glass are produced that it is difficult to obtain the desired strength at high temperatures.

It has been found that addition of certain oxides can enable the amount of titanium nitride included in the charge used to produce the material to be reduced to substantially below the level which has heretofore been considered necessary to confer electro-discharge machinability properties on the material. The inclusion of lower levels of titanium nitride enables improvements to be achieved with regard to oxidation behaviour and electro-discharge machine cutting behaviour (e.g. reduced tool wear) compared with materials containing relatively high levels of titanium nitride.

According to one aspect of the present invention, there is provided a dense, electrically conductive, substituted silicon nitride material, said material comprising a silicon aluminium oxynitride material having an expanded silicon nitride structure, particles of an electrically conductive nitride dispersed throughout said material, and a substantially continuous intergranular phase containing dispersed particles of an electrically conductive nitride.

Such a material can most conveniently be produced by incorporating electrically conductive particles in a charge used to produce the material and by forming the particles in the integranular phase in situ from the corresponding oxide.

According to a second aspect of the present invention, there is provided a dense, substituted silicon nitride material which is electrically conductive, said material comprising a silicon aluminium oxynitride material having an expanded silicon nitride structure, particles of an electrically conductive nitride dispersed throughout said material, and further particles of an electrically conductive nitride, wherein said further particles are smaller than the first mentioned electrically conductive nitride particles and are disposed between the latter so that the larger and smaller electrically conductive nitride particles together define a network of electrically conductive pathways throughout the material.

According to a third aspect of the present invention, there is provided a method of producing a dense, electrically conductive, substituted silicon nitride material comprising the steps of sintering a powder mixture containing (a) silicon, aluminium, oxygen, nitrogen, (b) particles of an electrically conductive nitride and (c) one or more glass-forming elements to form a silicon aluminium oxynitride material having an expanded silicon nitride structure, dispersed particles of said electrically conductive nitride, and a substantially continuous intergranular phase; wherein the powder mixture subjected to sintering also contains (d) an oxide of an element having a nitride which is electrically conductive and (e) sufficient additional nitrogen to react with said oxide to form the electrically conductive nitride of said element, and wherein said oxide is converted to said nitride in situ within the intergranular phase.

The dense, electrically conducting, substituted silicon nitride material produced according to the invention contains the electrically conductive particles in a range of particle sizes, some from the added nitride and some from that produced in situ by reaction.

The powder mixture most preferably contains substantially the same electrically conductive nitride as that produced in situ within the intergranular phase.

The amount of the electrically conductive nitride included in the powder is typically about 10 to 38 vol %. The electrically conductive nitride is preferably titanium nitride. When titanium nitride is included in the powder as the electrically conductive nitride, the typical amount of about 10 to 38 vol %, which equates to a weight range of about 15 to 50 wt %. In such a case, said oxide of an element having a nitride which is electrically conductive is preferably titanium dioxide. However, it is considered that other electrically conductive nitrides can be employed, for example, nitrides of lanthanum, cerium, zirconium and praesodymium.

It is to be appreciated that the elements needed to produce the required silicon aluminium oxynitride material having an expanded silicon nitride structure may be included in the powder mixture in any convenient combined form. For example, the elements, silicon, aluminium, oxygen and nitrogen, may be included in the form of silicon dioxide and aluminium nitride, or silicon nitride and aluminium oxide. However, it is preferred for such elements to be included in the form of silicon nitride and a so-called "polytype" material which is a silicon aluminium oxynitride having the crystal lattice structure of aluminium nitride, in which silicon atoms have partially replaced aluminium atoms and oxygen atoms have partially replaced nitrogen atoms while maintaining the electrical balance. Typical examples of such oxynitride are 15R ($SiAl_4O_2N_4$), 12H ($SiAl_5O_2N_5$), 21R ($SiAl_6O_2N_6$) and 27R ($SiAl_8O_2N_8$), with the 21R polytype being preferred.

The additional nitrogen which is contained in the powder mixture to react with the oxide to form the electrically conductive nitride of said element is preferably provided in the form of a suitably reactive nitride, most preferably aluminium nitride. Whilst the aluminium nitride may be provided as such in the powder mixture, it is difficult to handle and therefore it is preferred to include such aluminium nitride in a more stable form, most preferably in the form of an additional amount of said polytype material in excess of that necessary to produce said silicon aluminium oxynitride material.

Whilst the silicon aluminium oxynitride material required to be produced is preferably beta-phase substituted silicon nitride of the formula $Si_{6-z}Al_zN_{8-z}O_z$ (where z is greater than 0 and not greater than 3), it is also within the scope of the present invention to choose the ingredients of the powder mixture and the processing conditions in such a way as to produce a mixture of such beta-phase substituted silicon nitride and an alpha-phase substituted silicon nitride of the formula $M_x(Si,Al)_{12}(O,N)_{16}$ (where x is not greater than 2 and M is a modifying cation, e.g. yttrium, calcium, lithium, magnesium or cerium).

In addition to the processes described above for producing the beta-phase substituted silicon nitride material, such beta-phase material or a mixture of said beta-phase material and a controlled amount of said alpha-phase material may be produced by sintering and heat treating a ceramic powder containing a major proportion of the above-mentioned alpha-phase substituted silicon nitride material with at least one nitride of silicon and/or alumina, wherein the alumina represents not more than 10% by weight of the mixture. Such a technique is disclosed in European Patent publication No. 00870888.

The sintering temperature may be in the region of 1600° to 1900° C. The sintering time is inversely proportional to the temperature and is usually in the range of 10 minutes to 7 hours or more, depending upon the product required. Usually, the sintering will be effected in a number of stages at different temperatures within the above range.

Said at least one glass-forming element employed in the powder mixture may be yttrium, lithium, magnesium, calcium, scandium, cerium or other rare earth element present in the powder mixture in the form of the oxide or a compound thereof (e.g. the carbonate) which is capable of being converted to the oxide at the sintering temperature. Preferably, the powder mixture contains yttria.

The intergranular phase produced during sintering is a continuous glassy phase which aids densification of the material. The final material may include such an intergranular glassy phase. It has been found, however, that the electro-discharge machinability properties (resistivity and cutting rate) can be further improved by converting the intergranular glassy phase to an intergranular crystalline phase. The reason why this happens is not yet fully understood, but it is believed that as the glassy phase crystallises, the in situ formed electrically conductive particles are re-distributed within the intergranular phase and become concentrated in better defined current pathways between the larger electrically conductive nitride particles included in the original powder mixture. There may also be further conversion of a minor amount of Ti in the glass phase to TiN under the conditions prevailing during formation of the intergranular crystalline phase. The conversion of the intergranular glassy phase to an intergranular crystalline phase also serves to improve the high temperature creep properties of the material and results from heat treatment of the as-sintered material.

The heat treatment to convert the intergranular glassy phase to the intergranular crystalline phase may be constituted merely by a controlled slow cooling (e.g. less than 100° C./hr.) of the sintered material. However, the heat treatment to produce the intergranular crystalline phase is more preferably effected by a separate annealing step subsequent to cooling after sintering. The annealing step may be effected by re-heating the material to 1000° to 1400° C. and holding at one or more temperatures within this range. For example, 7 hours at 1250° C. followed by 5 hours at 1400° C.

As is conventional with sintering and annealing of these types of material, a non-oxidising atmosphere, typically nitrogen, is employed during each step. Sintering may be effected with or without the application of pressure.

The mean particle size of the electrically conductive nitride when included in the powder mixture is typically 1 to 3 micrometers, but it is within the scope of the invention to use sub-micron sized particles (e.g. of the order of 0.05 μm). The use of such sub-micron sized particles can lead to improved conductivity, and therefore may advantageously be used at the lower end of the content range mentioned previously for the added electrically conductive nitride. In the case where titanium nitride is employed, this usually has a surface oxygen impurity ($TiO_2$) thereon, the amount of which can vary substantially depending inter alia on the manner in which it has been produced and the particle size thereof. Accordingly, it is usually necessary to test each batch of titanium nitride to assess the level of surface oxygen impurity before forming the powder mixture so that the amount of titanium dioxide introduced into the powder mixture as an impurity on the surface of the titanium nitride can be accounted for when calculating the amount of additional nitrogen required to react therewith.

Whilst the oxide impurity on the surface of the electrically conductive nitride may provide the sole source of oxide required to be converted to the electrically conducting nitride, it is preferred to make a specific addition of oxide over and above any which may be present as an impurity on the added electrically conductive nitride. Thus, the amount of additional nitrogen provided in the powder mixture must be sufficient to react with the total amount of included oxide to be converted to the electrically conductive nitride.

As an alternative to including the oxide of the element having an electrically conductive nitride in the powder mixture, it may be convenient to include such element in the form of a compound (e.g. the carbonate) which is capable of forming the oxide at the sintering temperature so that the oxide enters the intergranular glassy phase before being converted to the electrically conductive nitride.

Although the precise mechanism by which the oxide is converted to the electrically conducting nitride is not yet fully understood, it is believed that the following reaction occurs:

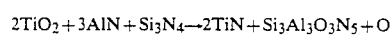

$$2TiO_2 + 3AlN + Si_3N_4 \rightarrow 2TiN + Si_3Al_3O_3N_5 + O$$

The theory that the above chemical reaction takes place is supported by the observation that increasing additions of $TiO_2$ to a sialon-forming charge result in increasing amounts of TiN being formed, and the beta-phase silicon aluminium oxide becoming increasingly expanded.

In order for the final product to be electro-discharge machinable, it is to be appreciated that the intergranular phase is a substantially continuous phase to ensure that a network of electrically conductive pathways is defined throughout the material.

In electro-discharge machining of TiN-containing sialon materials, the machine travel is a combination of material eroded and tool wear. It is observed that tool wear decreases with decreasing TiN contents. For example, at TiN contents of about 60 wt %, tool wear is about 60–70% of the machine travel whereas at TiN contents of about 20–30 wt %, tool wear is about 15–20% of the machine travel. The real cutting rate (expressed as material removed in unit time) is found to be high (3–4 mm$^3$/min) at low levels (25–30 wt %) of added TiN when 2–5 wt % TiN formed in situ by conversion of $TiO_2$ to TiN is present, as compared with the lower cutting rates (1–2 mm$^3$/min) experienced at higher levels of added TiN (50–60 wt %) without compositional control.

It is to be appreciated also that the powder mixture charge used to produce the desired material will contain the silicon, aluminium, oxygen and nitrogen in the required proportions so as to maintain the desired cation-/anion balance of 0.753 as well as to produce the required electrically conductive nitride in situ and the substantially continuous intergranular glassy phase. The cation/anion balance of 0.753 is calculated as $(Si+Al)/(O+N)$ without taking account of the added TiN which will remain unchanged, and also on the assumptions that the $Y_2O_3$ will be converted entirely to YAG ($Y_3Al_5O_{12}$) and that all the $TiO_2$ will be converted to TiN.

The present invention will be described in further detail in the following examples.

EXAMPLE 1

First, there is prepared a powder mixture consisting of 29.16 wt % TiN, 5.41 wt % $Y_2O_3$, 0.48 wt % $TiO_2$ 3.89 wt % $Al_2O_3$, 10.41 wt % 21R polytype ($SiAl_6O_2N_6$) and 50.65 wt % $Si_3N_4$. The titanium nitride has a mean particle size of 2 micrometers and a 0.65 wt % surface oxygen content (in the form of $TiO_2$), and is supplied by Kennametal under the designation L/TiN/Cl/336. The silicon nitride powder contains about 90 wt % of the alpha-phase material, has an average particle size of 1 micrometer and contains 3 wt % silica as an impurity. The 21R polytype has an average particle size of 4 micrometers and is supplied by Cookson Ceramics and Antimony Limited and contains 13.5% oxygen.

The above described powder mixture is isostatically pressed at a pressure of 150 MPa into billets which are sintered in a nitrogen atmosphere at 1600° C. for 2 hours and then at 1750° C. for 5 hours. The resultant sintered material comprises silicon aluminium oxynitride grains, the added titanium nitride particles, and a continuous intergranular glassy phase which contains dispersed titanium nitride which has been precipitated therefrom as a result of the reaction of the $TiO_2$ in the glassy phase.

The as-sintered material is found to be electro-discharge machinable on a GEE Series 2 machine manufactured by Glevum Electronic Equipment Ltd, having an electrode with a diameter of 9.6 mm at a cutting rate of 1.12 mm$^3$/min, and has a resistivity of $415 \times 10^{-6}$ ohm.m.

Following sintering, the product may then be heat treated to convert the intergranular glassy phase to a crystalline YAG phase. Such heat treatment is effected in a nitrogen atmosphere at 1250° C. for 7 hours followed by 5 hours at 1400° C. The resultant sintered and heat treated material contains about 63 wt % of a beta-phase substituted silicon nitride having the formula $Si_{6-z}Al_zN_{8-z}O_z$ (wherein z is about 1.5) 30 wt % of TiN, and about 7 wt % of YAG. Such material has a resistivity of $144 \times 10^{-6}$ ohm.m. and a cutting rate of 2.39 mm$^3$/min.

The amount of 21R polytype included in the mixture is calculated to restore the cation/anion ratio to 0.75 which would otherwise have been disturbed by the addition of the $TiO_2$.

EXAMPLE 2

Example 1 is repeated with the exception that the $TiO_2$ content of the powder mixture is increased to 1.39 wt %, the 21R polytype content of the powder mixture is increased to 13.04 wt % to restore the cation/anion ratio of 0.75 having regard to the increased $TiO_2$ content, and the $Si_3N_4$ content of the powder mixture is reduced to 47.11 wt % to compensate for the additional $TiO_2$ and 21R polytype.

The material after sintering but before heat treatment has a resistivity of $220 \times 10^{-6}$ ohm.m and a cutting rate of 1.22 mm$^3$/min. The material after sintering and heat treatment has a resistivity of $83.7 \times 10^{-6}$ ohm.m and a cutting rate of 2.47 mm$^3$/min.

EXAMPLE 3

Example 1 is repeated with the exception that the $TiO_2$ content of the powder mixture is increased to 6.42 wt %, the 21R polytype content of the powder mixture is increased to 27.3 wt % to restore the cation/anion ratio of 0.753 having regard to the increased $TiO_2$ content, and the $Si_3N_4$ content of the powder mixture is reduced to 27.9 wt % to compensate for the additional $TiO_2$ and 21R polytype.

The material after sintering but before heat treatment has a resistivity of $13.4 \times 10^{-6}$ ohm.m and a cutting rate of 4.05 mm$^3$/min. The material after sintering and heat treatment has a resistivity of $9.45 \times 10^{-6}$ ohm.m and a cutting rate of 4.25 mm$^3$/min.

EXAMPLE 4

Example 1 is repeated using a powder mixture comprising 45.6 wt % $Si_3N_4$, 19.83 wt % 21R polytype, 3.03 wt % $Al_2O_3$, 2.91 wt % $TiO_2$, 4.37 wt % $Y_2O_3$ and 24.26 wt % TiN.

The material after sintering but before heat treatment has a resistivity of $40124 \times 10^{-6}$ ohm.m which is too high to machine. The material after sintering and heat treatment has a resistivity of $12124 \times 10^{-6}$ ohm.m and a cutting rate of 0.82 mm$^3$/min. In this example, the cation/anion ratio is 0.7531.

Using the same TiN content and raising the $TiO_2$ content to 5.83 wt % requires 28.13 wt % 21R polytype to restore the cation/anion ratio to 0.7530. The $Si_3N_4$ content is thus reduced to 34.35 wt %. The material after sintering but before heat treatment has a resistivity of $458 \times 10^{-6}$ ohm.m and a cutting rate of 2.1 mm$^3$/min.

The material after sintering and heat treatment has a resistivity of $350 \times 10^{-6}$ ohm.m and cutting rate of 3.12 mm$^3$/min.

COMPARISON EXAMPLE.

Example 4 is repeated using the same amounts of $TiO_2$ and TiN, i.e. 5.83 wt % and 24.26 wt %, respectively, but the 21R polytype content of the powder mixture is not increased and is 11.67 wt %. The $Si_3N_4$ content is thus 50.81 wt % and the cation/anion ratio is not restored and is measured at 0.7251. The material is found to have a resistivity so high that it cannot be measured and is therefore not capable of being electro-discharge machined.

It is found that the addition of $TiO_2$ in materials having TiN contents greater than 50 wt % does not have such a marked effect since the TiN is present in a quantity sufficient to produce the required conductivity. However, as the TiN content is increased, so the aforementioned disadvantages also increase. However, as the $TiO_2$ content is increased, the strength of the material tends to be reduced so that, for any given application of the material, a compromise is chosen between the strength required and the degree of machinability. Thus, it is possible to select the properties required of the material to suit the intended use.

What is claimed is:

1. A dense, electrically conductive, substituted silicon nitride material, said material comprising:
   a silicon aluminum oxynitride having an expanded silicon nitride structure;
   particles of an electrically conductive nitride dispersed throughout said material; and
   a substantially continuous intergranular phase containing dispersed particles of an electrically conductive nitride, said dispersed particles in said intergranular phase having been formed in situ from the corresponding oxide.

2. A material as claimed in claim 1, wherein the dispersed particles of the electrically conductive nitride in the intergranular phase are smaller than the first mentioned electrically conductive nitride particles and are disposed between the latter so that the larger and smaller electrically conductive nitride particles together define a network of electrically conductive pathways throughout the material.

3. A material as claimed in claim 1, containing 10-38 vol % of said electrically conductive nitride.

4. A material as claimed in claim 1, wherein the electrically conductive nitride is titanium nitride.

5. A material as claimed in claim 4, containing about 20-30 wt % of titanium nitride.

6. A method of producing a dense, electrically conductive, substituted silicon nitride material, said method comprising the steps of:
   forming a powder mixture containing (a) silicon, aluminium, oxygen, nitrogen, (b) particles of an electrically conductive nitride, (c) one or more glass-forming elements, (d) an oxide of an element having a nitride which is electrically conductive and (e) sufficient additional nitrogen to react with said oxide to form the electrically conductive nitride of said element; and
   sintering said powder mixture to form a silicon aluminum oxynitride material having an expanded silicon nitride structure, dispersed particles of said electrically conductive nitride and a substantially continuous intergranular phase, said oxide being converted to said nitride in situ within said intergranular phase.

7. A method as claimed in claim 6, wherein the powder mixture contains substantially the same electrically conductive nitride as that produced in situ within the intergranular phase.

8. A method as claimed in claim 6, wherein 10-38 vol % of said electrically conductive nitride is included in the powder mixture.

9. A method as claimed in claim 6, wherein titanium nitride is included in the powder mixture as said electrically conductive nitride.

10. A method as claimed in claim 9, wherein about 20-30 wt % of titanium nitride is included in said powder mixture.

11. A method as claimed in claim 6, wherein said oxide of an element having a nitride which is electrically conductive is titanium dioxide.

12. A method as claimed in claim 6, wherein the silicon, aluminium, oxygen and nitrogen are included in the powder mixture in the form of silicon nitride and a polytype material which is a silicon aluminium oxynitride having the crystal lattice structure of aluminium nitride, in which silicon atoms have partially replaced aluminium atoms and oxygen atoms have partially replaced nitrogen atoms while maintaining the electrical balance.

13. A method as claimed in claim 12, wherein the polytype material is 21R polytype ($SiAl_6O_2N_8$).

14. A method as claimed in claim 12, wherein the additional nitrogen which is contained in the powder mixture to react with the oxide to form the electrically conductive nitride of said element is provided in the form of an additional amount of said polytype material in excess of that necessary to produce said silicon aluminium oxynitride material.

15. A method as claimed in claim 6, wherein said at least one glass-forming element employed in the powder mixture is selected from the group consisting of yttrium, lithium, magnesium, calcium, scandium, cerium and other rare earth elements present in the powder mixture in the form of the oxide or a compound thereof which is capable of being converted to the oxide at the sintering temperature.

16. A method as claimed in claim 6, wherein the intergranular phase produced during sintering is a continuous glassy phase which aids densification of the material, and the method further includes the step of converting the intergranular glassy phase to an intergranular crystalline phase.

17. A method as claimed in claim 6, wherein the mean particle size of the electrically conductive nitride in the powder mixture is up to about 3 micrometers.

18. A method as claimed in claim 6, including the steps of assessing the level of surface oxygen impurity on the electrically conductive nitride to be used in the powder mixture, and including a sufficient amount of said additional nitrogen to react with said surface oxygen impurities.

19. A method as claimed in claim 18, further comprising the steps of including said oxide in addition to any oxide which may be present as an impurity on the added electrically conductive nitride, and including an amount of additional nitrogen in the powder mixture which is sufficient to react with the total amount of included oxide to be converted to the electrically conductive nitride.

20. A method as claimed in claim 19, modified in that, as an alternative to including the oxide of the element having an electrically conductive nitride in the powder mixture, such element is included in the form of a compound which is capable of forming the oxide at the sintering temperature so that the oxide enters the intergranular phase before being converted to the electrically conductive nitride.

21. A method as claimed in claim 6, wherein the powder mixture charge used to produce the desired material contains the silicon, aluminium, oxygen and nitrogen in the required proportions so as to maintain a cation/anion balance with regard to these four elements of 0.753 as well as to produce the required electrically conductive nitride in situ and the substantially continuous intergranular phase.

* * * * *